Patented Oct. 27, 1925.

1,559,340

UNITED STATES PATENT OFFICE.

PETER MASUCCI, OF NORWOOD, PENNSYLVANIA, ASSIGNOR TO H. K. MULFORD COMPANY, OF GLENOLDEN, PENNSYLVANIA, A CORPORATION OF PENNSYLVANIA.

IRRITANT PRODUCT FROM THE RHUS PLANT AND PROCESS OF OBTAINING THE SAME.

No Drawing.   Application filed April 16, 1922.   Serial No. 632,528.

*To all whom it may concern:*

Be it known that I, PETER MASUCCI, a citizen of the United States, residing in Norwood, Delaware County, Pennsylvania, have invented an Irritant Product from the Rhus Plant and Process of Obtaining the Same, of which the following is a specification.

One object of my invention is to provide a new and useful product consisting of the pure irritant of vesicant principle of poisonous species of Rhus and it is also desired to provide a new and useful process for obtaining this product in a pure, stable, and concentrated form.

The term irritant or vesicant principle in poisonous species of Rhus as here employed is intended to refer to a chemical substance obtained from the leaves, stems, or roots of poisonous Rhus and is confined chiefly to the three prolific species, Rhus toxicodendron L., Rhus vernix L. (Rhus venenata D. C.) and R. diversiloba T., and G., although the same process may be applied to any species of Rhus.

In carrying out my invention, I prefer to proceed as follows: 5 lbs., of Rhus toxicodendron leaves are extracted repeatedly with 20,000 c. c. of purified petroleum benzine, although other fat solvents may be used, e. g. chloroform, ether, carbon tetrachloride, etc. This extraction may be accomplished by percolation or by immersing the leaves in petroleum benzine in a closed container for a period of at least two weeks, with frequent shaking. The petroleum benzine extract which contains the active principle, is filtered through ordinary filter paper and the clear but colored extract is now treated with an adsorbent, preferably fuller's earth of a high adsorbing power, in the proportion of about 100 grams of the earth to one liter of extract. The whole is agitated until the petroleum benzine becomes clear and colorless, after which the material is filtered through filter paper and the extract is concentrated by distilling the petroleum benzine under vacuum to one-tenth of its volume. The concentrated extract is then poured into evaporating dishes or pans and is allowed to evaporate spontaneously to dryness.

By this method of procedure, I obtain a pure product which contains the active irritant or vesicant principle and which is free from resins or resinous constituents as well as free from tannins, chlorophyll, carbohydrates, and all inorganic constituents. Said product is a fatty or waxy material possessing a definite melting point, a saponification value, and an iodine value and having the irritant or vesicant properties charactersistic of poisonous species of Rhus. Long exposure to air and sunlight causes the above product to become oxidized with a corresponding change in color and loss of irritant or vesicant properties. The fat or wax is insoluble in alcohol, but soluble in ether, benzine, carbon tetrachloride, chloroform, acetone and other fat solvents. It is also soluble in warm cottonseed oil, olive oil, sweet almond oil, and other vegetable fixed oils and I have discovered that an oily solution of said product may be used therapeutically.

It is to be understood that in using the term "the Rhus plant", I refer to and desire to include any and all parts of the plant growth comprised by the leaves, stem or roots of any of the varieties of poisonous Rhus.

I claim:

1. The process which consists in preparing a fluid extract of Rhus leaves, stems, or roots; treating said extract with an adsorbent to remove the non-active bodies; and evaporating the clear and colorless extract to dryness.

2. The process which consists in preparing a petroleum benzine extract of Rhus leaves, stems, or roots, treating said extract with an adsorbent to remove the non-active bodies; and evaporating the clear and colorless benzine extract to dryness.

3. The process which consists in preparing a petroleum benzine extract of Rhus leaves, stems, or roots; treating said extract with fuller's earth to remove the non-active bodies; and evaporating the clear and colorless benzine extract to dryness.

4. The process which consists in macerating the Rhus plant in petroleum benzine; separating the soluble matter by filtration; removing the non-active matter; and evaporating the extract to dryness.

5. As a new article of manufacture, a solution in a fixed vegetable oil of the irritant or vesicant principle of the Rhus plant, having the physiological and therapeutic characteristics of said plant.

6. As a new article of manufacture a solution in a fixed vegetable oil of the irritant or vesicant principle of the Rhus plant free from tannins, chlorophyll, carbohydrates, resins or resinous material, and inorganic salts, said compound having the physiological and therapeutic characteristics of said plant in substantially stable and concentrated form.

PETER MASUCCI.